United States Patent [19]

Sakuraba et al.

[11] Patent Number: 5,363,498
[45] Date of Patent: Nov. 8, 1994

[54] METHOD OF CONTROLLING SHARED DATA AMONG COMPUTERS

[75] Inventors: Taketoshi Sakuraba; Toshiaki Arai, both of Sagamihara; Nobuo Yamamoto, Yokohama; Masamitu Nomura, Ikoma; Kazuo Imai, Higashikurume; Michio Tandai; Toru Yamamoto, both of Yokohama, all of Japan

[73] Assignees: Hitachi, Ltd., Tokyo; Hitachi Seibu Soft Ware Co., Ltd., Osaka; Hitachi Software Engineering Co., Ltd., Yokohama, all of Japan

[21] Appl. No.: 649,891

[22] Filed: Feb. 4, 1991

[30] Foreign Application Priority Data

Feb. 9, 1990 [JP] Japan .................................. 2-28406
Sep. 25, 1990 [JP] Japan .................................. 2-251971

[51] Int. Cl.⁵ .............................................. G06F 13/10
[52] U.S. Cl. .................................. 395/425; 364/Dig. 1; 364/228.1; 364/243.41
[58] Field of Search ... 364/200 MS File, 900 MS File; 395/400, 425

[56] References Cited

U.S. PATENT DOCUMENTS

| | | | |
|---|---|---|---|
| 4,151,592 | 4/1979 | Suzuki et al. | 395/325 |
| 4,442,487 | 4/1984 | Fletcher et al. | 395/425 |
| 4,445,174 | 4/1984 | Fletcher et al. | 395/425 |
| 4,939,636 | 7/1990 | Nakagawa et al. | 395/425 |
| 5,060,186 | 10/1991 | Barbagelata et al. | 395/425 |
| 5,168,547 | 12/1992 | Miller et al. | 395/325 |

OTHER PUBLICATIONS

"Multiprocessor", Iwanami Information Science Dictionary, ISBN4-00-080074-4, 1990, pp. 438-439.
"Channel to Channel Adapter", HITAC Manual, 8080-2-072, pp. 1-25.
Alan Jay Smith, "Disk Cache—Miss Ratio Analysis and Design Considerations", ACM Transactions on Computer Systems, vol. 3, No. 3, 1985, pp. 161-203.

*Primary Examiner*—Joseph L. Dixon
*Assistant Examiner*—Hiep T. Nguyen
*Attorney, Agent, or Firm*—Fay, Sharpe, Beall, Fagan, Minnich & McKee

[57] ABSTRACT

A method of controlling data which is stored into a common storage in a multiprocessor system having a common storage which can be accessed from a plurality of computers is disclosed. Particularly, a method of controlling shared data using an extended storage as a common storage is disclosed. The copy of the data of a part of or all of a shared data set in an input/output device and the copy data control information to control the copied data are stored into the common extended storage. In the case of accessing the data in the common extended storage, the mutual exclusion among a plurality of computers and the consistency control of the data are realized by referring to the control information stored in the common extended storage.

9 Claims, 7 Drawing Sheets

METHOD OF CONTROLLING SHARED DATA AMONG COMPUTERS

BACKGROUND OF THE INVENTION

1. Field of the Invention

The present invention relates to a method of controlling data which is stored in a shared storage in a multiprocessor system which can be accessed from a plurality of computers and, more particularly, to a method of controlling shared data in which an extended storage (hereinafter, abbreviated as "ES") is used as a shared storage.

2. Description of the Related Art

A loosely coupled multiprocessor (hereinafter, abbreviated to "LCMP" system has been disclosed in the column of "Multiprocessor", Iwanami Information Science Dictionary, ISBN4-00-080074-4, pages 438–439, 1990. According to the above disclosure, the LCMP system is constructed in a manner such that a plurality of stand alone computer systems share an input/output (I/O) device and the shared I/O device can be accessed from each of the computer systems. The stand alone computer system denotes a computer system which is constructed in a manner such that a plurality of CPUs (tightly coupled multiprocessor: hereinafter, abbreviated to "TCMP" which are coupled by sharing one CPU (Central Processing Unit) or one memory are used as a center and that a control program (operating system: OS) of each CPU independently operates.

Hereinafter, it is assumed that "system" or "computer system" simply denotes a stand alone computer system or computer. On the other hand, the I/O device which is shared among the stand alone computer systems denotes an input/output device which is provided with an input/output interface so that input and output can be performed to/from a plurality of stand alone computer systems. For instance, in the case where data on one disk is used by a plurality of systems, an expression such that "the disk is shared" is used. Data such as data base, catalogue, and the like can be referred to as such data.

In the LCMP system, when modifying data on a disk apparatus which is shared by a plurality of computers, integrity of data may be lost because accesses from a plurality of computers to the disk apparatus conflict with each other. To prevent such a situation, a mutual exclusion of a shared resource (shared disk apparatus, shared data set (file)) must be executed among the computers. It is necessary to perform communications among the computers in order to execute the mutual exclusion.

Hitherto, a channel to channel communication mechanism is used to connect the computers for communication. The channel to channel communication mechanism is an input/output device when it is seen from each computer. When the first computer generates data to the channel to channel communication mechanism, an interruption is performed to the second computer coupled with the channel to channel communication mechanism. The interrupted second computer generates an input request to the channel to channel communication mechanism and receives the data which was supplied from the first computer. The channel to channel communication mechanism has been described in detail in the HITAC manual "Channel to channel adapter" 8080-2-072.

As a mutual exclusion method of the shared data set in the LCMP system, a method is used whereby each computer generates an ENQ (request for using a serially reusable resource)/DEQ (notify end of using of serially reuseable resource) command and transmit such command to the shared resource and controls. Commands (ENQ/DEQ) and the like for the mutual exclusion are transmitted and received by using the foregoing channel to channel communication mechanism. The accessing order from the computers to the shared resource can be set.

On the other hand, there is also a method whereby it is possible to set a state in which during the access to the shared data set, the whole disk apparatus including the shared data set cannot be accessed from the other computers. According to such a method, on the basis of input/output commands for the disk apparatus, a disk control apparatus does not accept the accesses from the other computers. After completion of the access to the disk apparatus, the above state is cancelled. According to the above method, there is no need to execute the communications among the computers.

There is a case of using the following methods in order to make an accessing speed to the data on the disk high. A partial area in a main memory (hereinafter, simply referred to as a memory) is assured and a part or all of the data stored in the disk is arranged (stored) into the area. The computer transfers the data (copy data) held in the assured area in the memory to the location (address indicated by the program) in the memory from which the data should be read out in place of the access to the disk. A staging of the data into the assured area in the memory, that is, an initial writing is executed by reading out the data from the disk at the first accessing time and storing into the assured area in the memory. The assured area can be also held in a cache memory provided in each computer.

In the case of the LCMP system, such a method for performance improvement cannot be unconditionally applied to the shared data set. This is because if the shared data was modified, mismatch occurs in the copy data corresponding to the modified data in each computer system. For instance, the following situation occurs. Two different computer systems stage the copy of the data in each of the main memories. After that, one (first) of the computer systems modifies certain data in the shared data sets in the memory of the first computer system and the disk. On the other hand, the other (second) computer system cannot be informed of the modified contents regarding the data which had been modified by the first computer system even if the second computer system accessed the copy data in the memory of the second computer system. If the second computer system further modified the data, the integrity of the data between the disk and each main memory is lost.

Therefore, in the case of applying the method for performance improvement of the access as mentioned above, it is necessary to use either (1) a method of limiting such that the access to the data set is performed for only reference or (2) a method of performing a certain consistency control between the computer systems so as to permit the modification of the data.

As a method of the consistency control, there is the following method. That is, any one of the computer systems is set as a host system. The host system controls the modification of the data. The other computer systems inquire and report the information regarding the data modification to the host system each time the data is accessed. As mentioned above, the host system controls the modification of the shared data.

On the other hand, there is also a method whereby each time the data is modified, the modification information is informed to the other computer systems which share the modified data by using an interruption or the like.

Further, the following method has been disclosed in "ACM Transactions on Computer Systems", Vol 3, No. 3, pages 161 to 203, 1985. A control apparatus of the disk has a memory (disk cache memory) which can be accessed at a high speed. The data which has been stored in the disk and is frequently used is stored into the disk cache memory. The access to the disk from the computer is substituted by the access to the disk cache memory. By applying the above method to the LCMP system, the disk control apparatus, particularly, the disk cache memory is shared among the computer systems together with the disk apparatus.

SUMMARY OF THE INVENTION

It is an object of the invention to provide a method of controlling shared data among stand alone computer systems, in which in an LCMP system, data transfer among stand alone computer systems is controlled so that an overhead is decreased for the consistency control among the stand alone computer systems and a loss by partition is reduced, and the accessing speed to a data set which is shared among the systems is made high.

Another object of the invention is to provide a method of controlling shared data among stand alone systems in which an effect of increasing of a memory capacity effectively contributes to make accessing speed to a shared data set high.

Still another object of the invention is to provide a method of controlling shared data among stand alone systems, in which mutual exclusion accompanied with the input/output control is efficiently executed.

The above objects of the invention are set on the basis of the recognition of the following subjects for the conventional techniques.

Both of the conventional methods determining a host system and the conventional method of informing the modification information to the other computer systems each time the data is modified use a channel to channel communication mechanism for communication among the computer systems. Therefore, although the input and output processes for the disk are reduced, the input and output processes by the channel to channel communication mechanism are added. Consequently, the number of executing steps for the input/output processes cannot be always reduced. In the case of the former method, it is necessary to perform the communication twice for sending and receiving, so the overhead is large. In the case of the latter method, since an interruption occurs in the other computer systems, an interrupting process to the other computer systems increases with respect to the data having a high modification frequency.

According to the conventional method using the disk cache, as for the program in each of the computer systems, if the data set is accessed, data remains in the disk cache which is shared, so that the accessing speed in the subsequent data access is made high. However, the accessing operation to the disk cache is input and output operations when it is seen from the computer. The number of executing steps such as forming process of input and output commands to access, input/output completion interrupting process, and the like is not reduced. Further, in the disk cache method, the processor in the disk control apparatus controls the disk apparatus and the disk cache (in which data and control information of the data have been stored). The processor in the disk control apparatus executes the access to the data in the disk cache and the control. Therefore, each of the stand alone computer systems cannot control the input/output of the data by using the data control information in the disk cache.

On the other hand, according to the method using the disk cache, a plurality of disks can be connected to one disk control apparatus. Even in the case where the data in the disk cache was hit (the data to be accessed exists in the disk cache), the data cannot be simultaneously accessed from a plurality of computers and an access request which is generated thereafter is waited. Thus, there is a problem such that the access time becomes long when utilization of the disk is high.

In the method whereby each of the computer systems executes the cache control, the same data is overlappingly staged in each of the computer systems even if one cache area lacked, the other space area cannot be used, or the like. A loss by partition occurs. As the number of computer systems increases, a degree of unnecessary access due to the loss by partition increases.

On the other hand, even if the memory capacity of the computer system is increased, it doesn't directly contribute to the realization of a high data accessing speed. Such a point is a disadvantage which cannot be ignored from a viewpoint of a trend of increasing of equipped memory.

To accomplish the above objects, according to the invention, an extended storage (ES) is shared, that is, a common extended storage (hereinafter, abbreviated to "CES") is used and, further, the invention is constructed in the following manner.

(1) Copies of the data of a part of or all of a shared data set in an input/output device and copy data control information (including identifiers of the copied data and location information of the data in the CES) to control the copied data are stored into the extended storage.

(2) If an access request from each stand alone computer system is an input request, a check is made to see if the requested data exists in the common extended storage or not by referring to the copy data control information. If the requested data exists in the CES, the requested data is transferred from the CES to the computer system and the inputting process is completed. If the requested data doesn't exist in the CES, the requested data is extracted from the shared data set and transferred to the computer system and is also copied into the CES. In association with the copying process, the identifier of the copy data and the copy data control information such as storage location information and the like in the CES are stored into the CES.

(3) If the access request from each stand alone computer system is an output request, the data is supplied to the shared input/output device. A check is also made to see if the copy data in a preceding state of the output data exists in the CES or not by referring to the copy data control information. If the copy data exists in the CES, the copy data is rewritten to the output data. If the copy data doesn't exist in the CES, an area is newly prepared in the CES and the output data is written into such an area. Further, the copy data control information is newly formed and stored into the CES. The copy data and the copy data control information are used to substitute the access to the data of the shared data set by the access to the CES at the time of the subsequent access to the data.

(4) The copy data control information includes original control information and version information. In the invention, as a common extended storage access instruction, a serialize instruction (CDSES instruction) which inhibits the access to a predetermined area in the CES from the other stand alone computer systems and is used to execute by a single instruction is provided.

(5) A control table to store the copy data control information is partitioned and constructed by portions whose contents are unchanged during the access to the corresponding data and portions whose contents may be changed. In each computer system, the unchanged portions in the control table are previously read from the CES into the computer system. In the case of accessing the copy data, when referring to the unchanged portions of the copy data control information, the computer system refers to the information of the unchanged portions of the copy data control information which has previously been read into the computer system. When referring to the portions whose contents may be changed in the copy data control information, the computer system refers to the copy data control information in the CES.

(6) The copy data which has already been written in the CES is not deleted. In the case where the computer system generates an access request, the presence or absence of the copy data is discriminated by referring to the copy data control information which has already been read into the computer system. If the copy data exists, the copy data in the CES is accessed the copy data doesn't exist, the copy data control information in the CES is newly read into the computer system. A check is again made to see if the copy data exists in the CES or not by referring to the copy data control information which was newly read. If the copy data exists, the copy data in the CES is accessed. the copy data doesn't exist, the data in the shared input/output device such as a shared disk is accessed.

(7) Data of a data base, a catalogue data set (data set to control the data sets), or the like can be used as the data which is shared among the systems.

The invention has the following effects and advantages on the basis of the above construction.

As distinguished from the case of accessing to the shared disk cache, no input and output process is needed to access to the CES. In the case of accessing the CES, the computer system (each of processors $IP_1$, $IP_2$, . . .) can access by a machine word instruction of one step, so that a pre-process and a post-process in association with the input/output processes are also unnecessary. Therefore, there is an advantage such that the overhead due to the data access decreases (accessing time is reduced). Further, the following effects are also derived in correspondence to embodiments of the invention.

The copy of the data of the shared data set which was accessed by each computer system is staged into the CES (transfer, preservation, and control to the CES) and the subsequent access to the data is substituted by the access to the copy data in the CES. Further, since the control information of the copy data in the CES is also stored into the CES, the information regarding the data which has already been staged in the CES can also be easily determined by the other computer systems. As mentioned above, by storing the copy data of the shared data set and the copy control information into the CES which is shared by the computer systems, the consistency of the data in the CES is accomplished and there is no need to execute the consistency control of the data among the computer systems. Consequently, by increasing the capacity of the CES (increasing the memory), the total performance of the LCMP system can be improved.

The copy data control information and copy data in the CES can be simultaneously accessed from two processors (excluding the case where the serialize instruction is being executed). According to the conventional disk cache method, they cannot simultaneously be accessed even if the disk cache was hit. Therefore, a large improvement is obtained by the invention.

In the invention, in correspondence to the area of the copy data, a modification counter (version number) of the area is provided and the copy control information is modified while confirming a change in version number. Therefore, the version number can be counted up (the copy data can be modified) in accordance with the correct order. That is, the mutual exclusion can be easily realized.

Although the accessing speed to the CES is higher than that of the ordinary input/output device, it is slower than that in the case of referring to the main memory. Since the access unit (size of data which is read and written by a single access) to the CES is large, it requires a long transfer time. Moreover, since the access is executed as a machine instruction by the CPU, the access costs per one access to the CES are large. Therefore, it is desirable to reduce the number of accesses to the copy data control information and the transfer data size. For this purpose, according to the invention, the portions whose contents are not modified during the access in the copy data control information are previously stored into the main memory in each computer system and are accessed. Thus, the overhead due to the access to the CES can be reduced. The access to the portions of the copy data control information whose contents are not modified during the access is not accompanied with the access to the CES.

The invention further provides the following method to reduce the number of references to of the copy data control information in the CES. In the new staging from the shared disk to the CES, the copy of the data is newly added. That is, by inhibiting the deletion of the data which has already been staged and the control information of such data, the corresponding data certainly exists in the CES so long as the control information (portions whose contents are unchanged) exists in the computer system, so that unnecessary access to the CES is eliminated.

BRIEF DESCRIPTION OF THE DRAWINGS

The objects and features of the invention will best be understood from a detailed description of a preferred embodiment thereof, selected for purposes of illustration and shown in the accompanying drawings, in which.

DESCRIPTION OF THE PREFERRED EMBODIMENTS

An embodiment of the invention will be described hereinbelow. An outline and a feature of the invention will be first described before showing practical construction and operation.

In the invention, an extended storage (ES) is shared, that is, a common extended storage (hereinafter, abbreviated to "CES" is used. The invention is, further, constructed in the following manner.

(1) The copy of the data of a part of or all of a shared data set in an input/output device and the copy data control information (including the identifiers of the copied data and the location information in the CES of the data) to control the copied data are stored into the common extended storage (CES).

(2) If an access request which is generated in each of stand alone computer systems (processors) is an input request, a check is made to see if the requested data exists in the CES or not by referring to the copy data control information. If the requested data exists in the CES as a result of the discrimination, the requested data is transferred from the CES and the inputting process is completed. If the requested data doesn't exist in the CES, the requested data is input from the shared data set and copied to the CES. Further, the identifiers of the copied data and the copy data control information including the location information in the CES are stored into the CES.

(3) If the access request which is generated in each of the stand alone computer systems is an output request, the data is supplied to the shared input/output device and the copy data control information is searched, thereby discriminating whether the copy data in a state before the output data is generated exists in the CES or not. If the copy data exists as a result of the discrimination, the copy data is rewritten by the output data. If the copy data doesn't exist, an area is newly prepared in the CES and the output data is written into the area. In addition, copy data control information to control the copy data is newly formed and stored into the CES. The subsequent access to such data of the shared data set is substituted by the access to the CES.

(4) The copy data control information includes the original control information and the version information. A serialize instruction (CDSES instruction) for executing a series of steps, which will be explained hereinbelow, by one instruction by inhibiting the access to a predetermined area in the CES from the other stand alone computer systems is provided as a CES access instruction. The above series of steps are as follows.

(a) The copy data control information in the CES is copied to the main storage. (b) The version information of the copy data control information in the main storage which was copied is saved as old version information. A predetermined modifying process is executed to the copy data control information in the main storage which was copied, thereby obtaining the copy data control information whose version-up was performed. (c) The version information in the CES is compared with the old version information in the main storage. (d) If both of the version information are equal as a result of the comparison, the copy data control information in the CES is rewritten to the copy data control information having the contents whose version-up was performed in the main storage. (e) If both of the version information are not equal (fail to modify) as a result of the comparison, the copy data control information in the CES is again copied to the main storage and the relevant instruction is retried from the above step (b).

If the modification failed, a necessary changing process is executed on the basis of the copy data control information which was newly read and the number of modifying times is counted up. By repetitively executing the serialize instruction from the step (b) until the modification is succeeded, the modification of the copy data control information is serialized among the stand alone systems (the details will be explained hereinafter by using FIG. 3).

(5) A control table to store the copy data control information is partitioned and constructed by portions whose contents are unchanged during the access to the corresponding copy data and portions whose contents may be changed. On the other hand, as for the control program (OS) of each computer system, the unchanged portions are previously read into each computer system from the CES. In the accessing process to the copy data by the computer system, when referring to the unchanged portions of the copy data control information, the information of the unchanged portions in the copy data control information which has already been read in the computer system is referred. When referring to the changeable portions of the copy data control information, the copy data control information in the CES is read every time such portions are referred. (The details will be explained hereinafter by using FIG. 4).

(6) The copy data which has already been written in the CES is not deleted. If an access request was generated, the presence or absence of the copy data is discriminated by referring to the copy data control information which has already been read in the computer system. If the copy data exists as a result of the discrimination, the copy data in the CES is accessed. On the other hand, if the copy data doesn't exist as a result of the discrimination, the copy data control information in the CES is newly read into the computer system. A check is again made to see if the copy data exists in the CES or not by referring to the copy data control information which was newly read. If the copy data exists as a result of the rediscrimination, the copy data in the CES is accessed. If the copy data doesn't exist as a result of the rediscrimination, the data in the shared disk as a shared input/output device is accessed. (The details will be explained hereinafter by using FIGS. 7 and 8).

(7) Data of a data base or data of a catalogue data set (data set to control data sets) can also be used as data which is shared among the systems.

The following effects and advantages are derived from the above construction.

As distinguished from the case of the access to the shared disk cache, the input and output processes are unnecessary in the access to the CES, which will be explained in the embodiment. The CES can be accessed by a machine word instruction of one word in each of the computer systems (processors $IP_1$, $IP_2$, . . .). Therefore, the pre-process and the post-process in association with the input and output can be omitted. The overhead of the CPU is reduced and the data access can be completed. In addition to the above advantages, the embodiment has the following effects.

(1) In the embodiment, the copy data of the shared data set which was accessed by the systems is staged into the CES (transfer, preservation, and control to the CES). When the data is subsequently accessed, the copy data in the CES is accessed.

In the embodiment, further, the control information of the copy data in the CES is also stored into the CES. The information regarding the staged data can be easily known by the other computer system.

As mentioned above, in the case of making the accessing speed of the shared data set of the LCMP system high, by holding the copy data of the shared data set and the data including the copy data control information into the CES which is shared by the systems instead of the memory of each system in the LCMP system, there is no need to execute the consistency control of the data among the systems.

By increasing the capacity of the CES, the total performance of the LCMP system due to an increase in memory can be improved.

According to the embodiment, since the copy data control information in the CES can be simultaneously accessed by a plurality of processors, the copy data itself in the CES (if they are different data) can be also simultaneously accessed. On the other hand, as mentioned above, in the conventional disk cache method, even if the disk cache was hit, the same disk cannot be simultaneously accessed by a plurality of computers so long as the access to the same disk.

(2) When the access request is an input request, if the requested data exists in the CES, the data is transferred to the main storage from the CES. If the requested data doesn't exist, the relevant data is transferred to the main storage from the shared data set in a peripheral equipment (disk) and the copy data is also stored into the CES. Further, the copy data control information including the identifiers of the copy data and the storage location information in the CES is also stored into the CES. Due to this, since the subsequent access to the data is executed to the data in the CES, the accessing time is reduced.

(3) If the access request is an output request, the data is supplied to a shared peripheral equipment (disk). If the copy data in a state before the output data is generated exists in the CES, the copy data is rewritten to the output data. If the copy data doesn't exist, the output data is written into a new area in the CES and the copy data control information regarding the copy data is newly stored into the CES. Thus, the subsequent access to the data is executed to the copy data in the CES and the accessing time is reduced.

(4) The CES is a storage which can transfer data from each system among the main storages of the systems by one machine word instruction without executing the input and output processes. A data transfer unit is set to 4 kB (kilo-bytes). Each of the data partitioned on a 4 kB unit basis is called a page.

CES access instructions include a WES (Write ES) instruction to transfer data from the main storage to the CES and an RES (Read ES) instruction to transfer data from the CES to the main storage. Further, the CES access instructions include a CDSES (Compare Data Swap ES) instruction to serialize (to prevent that two processors simultaneously enter one area) the resource in the CES and an SIGES (Signal ES) instruction to interrupt the other systems which share the ES.

The CDSES instruction is used to compare eight bytes of the head of the page of 4 kB in the CES and eight bytes of the head of the page of 4 kB in the main storage. If they coincide, the contents in the subsequent main storage area including eight bytes of the head which were compared are transferred to the CES area, thereby modifying the contents in the CES. If they differ, the contents in the area in the CES are transferred to the area in the main storage. A transfer data length can be designated to an instruction. The access from the other systems to the area in the CES regarding the data transfer is inhibited during the transfer and the consistency between the compared contents and the data is guaranteed. (The details will be described hereinafter by using FIG. 3).

The SIGES instruction is used to interrupt the other systems which share the CES and message data can be sent as interruption information.

In the embodiment, a modification counter, that is, a version number of the relevant area is provided for eight bytes of the head page in the copy data control information. The copy control information is modified, that is, the area is modified, in other words, the version up is executed while confirming that the version number is not changed by using the CDSES instruction.

Figure 1:
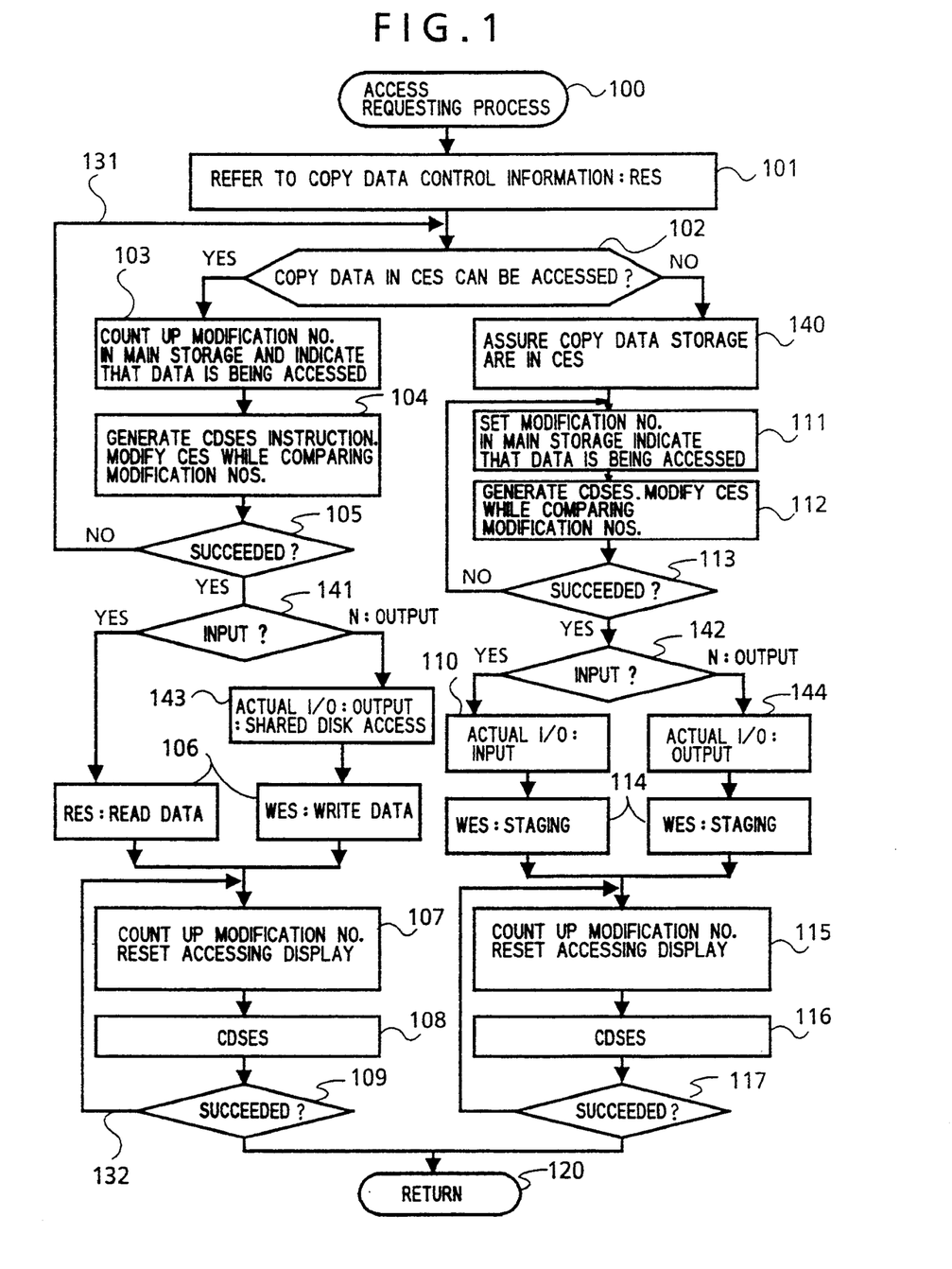
FIG. 1 is a flowchart showing a control method of the data access to a common extended storage according to an embodiment of the invention.

Practically speaking, the process for the access request to the shared data set is executed in the following manner (the details will be described hereinafter by using FIG. 1).

The copy data control information in the CES is transferred to the main storage. Checks are made to see if the copy of the data which was access requested exists in the CES or not and to see if such a copy data can be accessed or not by using the copy data control information. If the copy data can be accessed as a result of the discrimination, information indicating that the control information of the copy data is being accessed is written into the copy of the copy data control information which was read into the main storage. The modification number is counted up. As the data in the main storage, the copy of the copy data control information which was modified in the main storage is designated. As the data in the CES, the area of the copy data control information is designated and the CDSES instruction is executed. If the execution of the CDSES instruction failed, processes similar to the processes mentioned above are repeated to the copy data control information which was newly read. If the execution of the CDSES instruction succeeded, the data transfer of the copy data is executed by using the RES or WES instruction on the basis of the copy data control information. After completion of the data transfer, access completion information is written into the copy of the copy data control information in the main storage and the modification number is counted up. The copy of the copy data control information which was modified in the main storage is again designated as the data in the main storage. The area of the copy data control information is designated as the data in the CES. The CDSES instruction is executed. Further, if the execution of the CDSES instruction failed, similar processes are repeated to the copy data control information which is newly read. If the execution of the CDSES instruction succeeded, the accessing process is finished.

As mentioned above, in order to perform the mutual exclusion which is needed among the systems in association with the modification of the copy data control information in the CES, the CDSES instruction is executed while comparing the version numbers stored in the CES. Therefore, the version-up process can be executed in accordance with the correct order. That is, the mutual exclusion is realized.

(5) The accessing speed of the CES is generally fairly higher than that of the input/output device. However, the accessing speed of the CES is slower than the speed to refer the memory. Further, the accessing unit is large, so that it takes a time to complete the data transfer. Moreover, since processes are executed as a machine word instruction by the CPU, the costs of a single access to the CES are large. Therefore, it is necessary to reduce the number of accessing times of the copy data control information and a transfer data length.

For this purpose, the control information of the copy data is divided (that is, structurized) into the portions whose contents are not modified during the access and the portions whose contents may be modified in accordance with the access. The copy of the portions whose contents are not modified is stored into the main storage of each system. In the accessing process, the copy is referred (in the main storage in the system) and the portions whose contents can be modified are read out of the CES and the presence or absence of the copy data is discriminated.

As mentioned above, the copy data control information is structurized and divided into the portions and is, further, partitioned to the portions whose contents are not modified and the portions whose contents can be modified, and the access to the unmodified portions is performed to the copy held in the main storage in each system, so that the overhead by the CES access can be reduced.

(6) On the other hand, the embodiment intends to provide the following method as another method whereby the number of times to refer to the copy data control information from the CES can be reduced.

In the new staging to the CES from the shared disk, the data which has already been staged is not deleted but the copy of the data is newly added. First, a check is made to see if data exists in the CES or not by using the copy of the copy data control information which has already been read and stored by each system. If the data exists in the CES, the latest copy data control information is read out of the CES and the presence or absence of data is further discriminated by using the latest copy data control information. On the basis of the result of the discrimination, either a mode to access to the CES or a mode to access to the shared disk is decided. By allowing only the add-on process, if control information exists in the system, the CES access for retrieval can be avoided.

The above embodiment will now be described in detail hereinbelow by using the drawings.

Figure 2:
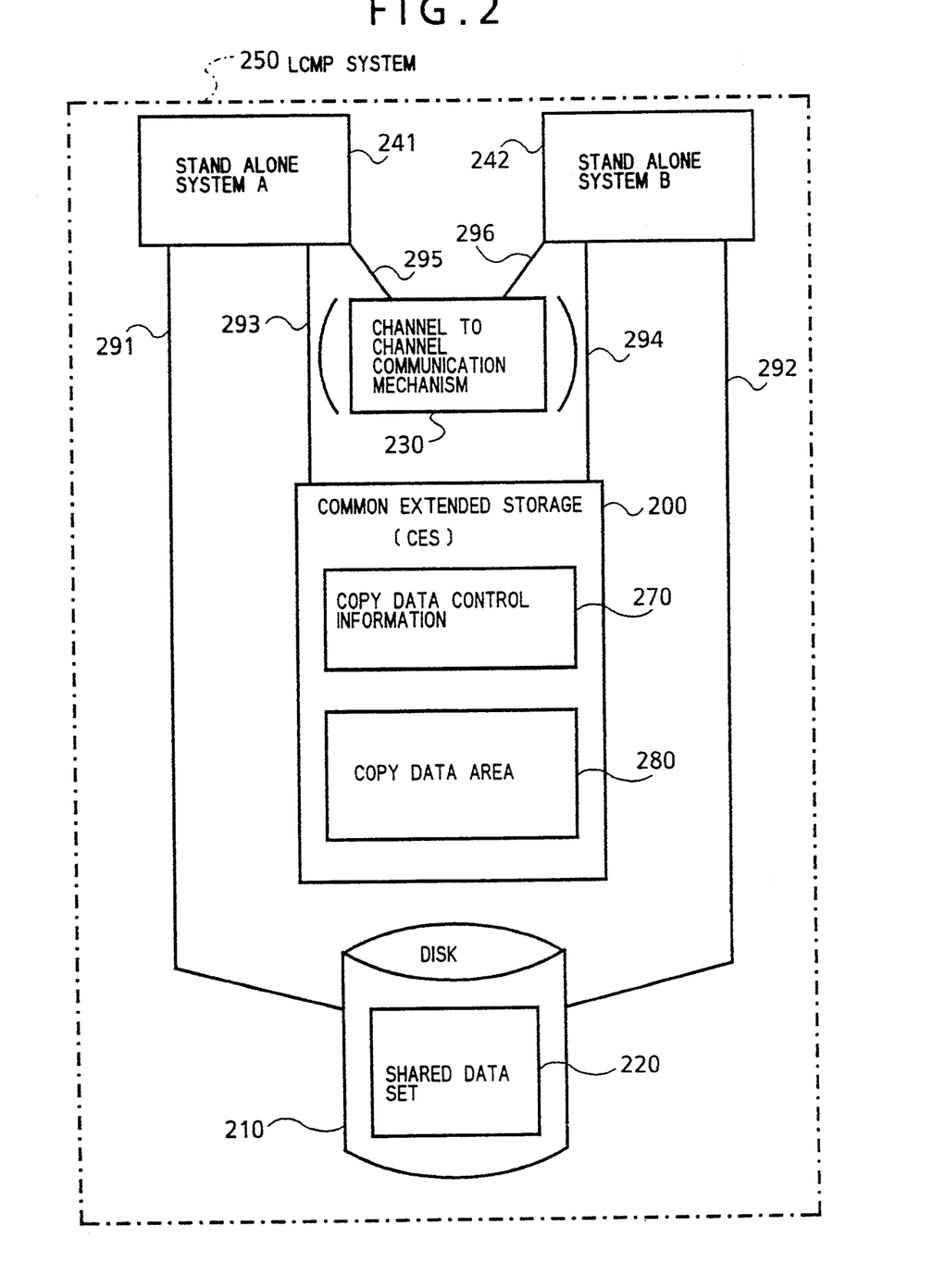
FIG. 2 is a block diagram showing an outline of an LCMP system which the invention is applied.

FIG. 2 is a block diagram showing an outline of a construction of an LCMP system to which the invention is applied.

An LCMP system 250 includes a stand alone system A 241 and a stand alone system B 242. Both of the stand alone systems 241 and 242 can access a shared disk 210 through an input/output interface 291 or 292, respectively. A channel to channel communication mechanism 230 is an apparatus which is provided for communication (by signal lines 295 and 296) between the stand alone systems in the conventional LCMP system. However, such a mechanism 230 is not always necessary to embody the invention. Although two stand alone systems have been shown in FIG. 2, the LCMP system can be also constructed by three or more stand alone systems. Another device or a plurality of disks can be also used in place of the shared input/output device.

The LCMP system 250 further has a common extended storage CES 200 and can access from the stand alone systems 241 and 242 through an access interface 293 or 294.

In the embodiment, the copy of the data of a shared data set 220 has been stored in a copy data area 280 in the CES 200. Control information 270 of the copy data is also stored into the CES 200.

Figure 3:
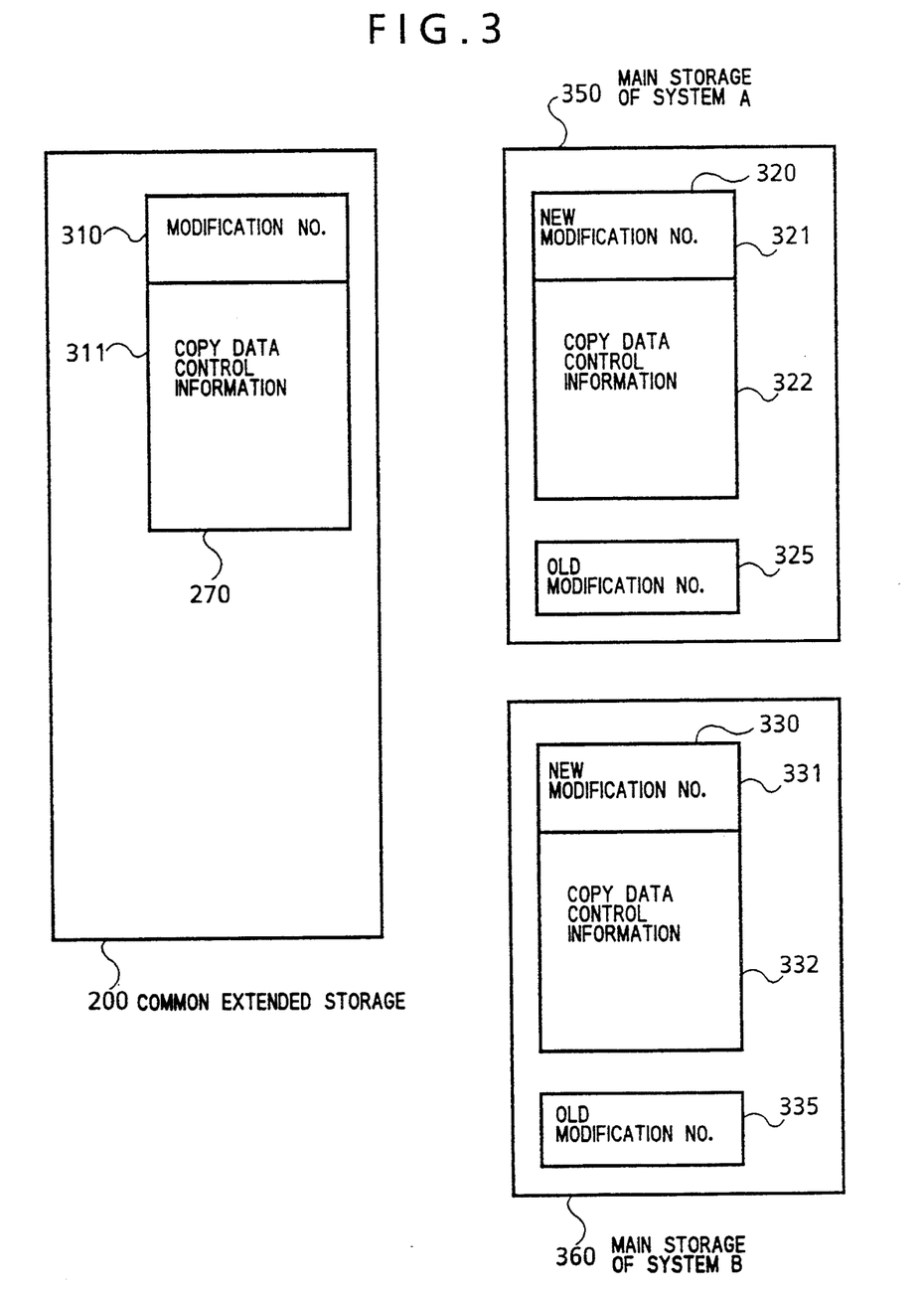
FIG. 3 is an explanatory diagram showing a serialize instruction (CDSES instruction) in an embodiment of the invention and its using method.

The CDSES instruction to serialize the use of the resource in the CES 200 will now be described by using FIG. 3. The copy data control information 270 has an area of true control information 311 such as storage addresses of the copy data and the like and an area of a modification number 310 indicative of the number of modifying times of the control information 311. A copy area 320 of the copy data control information 270 is provided in a main storage 350 of the stand alone system 241. An old modification number 325 is provided as a field to save the modification number into the main storage 350. When the copy data control information 270 is modified, the content of a new modification number 321 of the copy area 320 of the copy data control information 270 is saved into the old modification number 325. A value which is obtained by adding "1" to the new modification number 321 is stored into the number field 321 as a new modification number. A desired modification is executed to a copy 322 of the true copy data control information.

The CDSES instruction must guarantee a point that for a period of time from a time point after one system, for example, the system A 241 reads the data from the CES 200 into the main storage 350 to a time point when the data after completion of a predetermined process is written into the CES 200 from the main storage 350, the data in the CES 200 is not rewritten by the other system, for instance, the system B 242.

Therefore, the control program of each system designates the copy data control information 270 in the CES 200 and the new copy data control information 320 and the old modification number 325 in the main storage 350 and generates the CDSES instruction. When the execution of the CDSES instruction is started, the modification number 310 in the CES 200 is compared with the old modification number 325 in the main storage 350. If they coincide (in other words, if the contents in the CES are not rewritten by the other system), the contents of the copy data control information 320 are transferred to the copy data control information 270 and the modification is completed. If they differ (that is, if the contents in the CES 200 have been rewritten by the other system), the contents of the copy data control information 270 are transferred into the area 320 in the main storage 350 and a retry is executed as shown below.

If the modification of the in-formation area 270 in the CES 200 failed as a result of the execution of the CDSES instruction, for the latest copy data control information which was newly read into the main storage 350 from the CES 200, the modification in the copy area 320 of the copy data control information, the saving of the modification number, and the count-up of the new modification number 321 are executed. The modification by the CDSES instruction is retried.

By the above modification, the modification number is counted one by one, the copy data control information is continuously modified, and the correct modification as scheduled by the control program of each system can be realized. It is now assumed that the stand alone system B 242 rewrote the copy data control information 270 to data 330 in a main storage 360 for a period of time when the stand alone system A 241 is executing an internal process. Since such a modification is also performed in the system B 242 in a manner similar to the above, the modification number 310 is counted up and doesn't coincide with the value stored in the old modification number 325 in the system A 241. Therefore, this means that the modification by the CDSES instruction which was generated by the system A 241 failed. Therefore, the system A 241 newly executes the modification on the basis of the value of the modification number 310 which was rewritten by the system B 242.

A method of accessing to the copy data in the CES 200 by applying a modifying method of the copy data control information mentioned above will now be described with reference to a flowchart shown in FIG. 1. Explanation will be made with respect to an access requesting process 100 to the shared data set 220 in the stand alone system A 241.

First, the copy data control information 270 is read into the area 320 in the main storage 350 (step 101).

A check is made to see if the copy of the data to which the access is requested exists in the CES 200 and can be accessed or not by referring to the copy data control information 322 which was read (step 102). If the copy data can be accessed, step 103 follows. If the copy data cannot be accessed, step 140 follows.

If the copy data can be accessed, information indicating that the data is being accessed is written into the control information of the copy data to be accessed and the modification number is saved and counted up (step 103).

As mentioned above, the CDSES instruction is now generated (step 104) to modify the CES while comparing the modification numbers as mentioned above. A check is made to see if the execution of the CDSES instruction, namely, the modification of the CES succeeded or failed (step 105). If the modification failed, the processing routine is returned to step 102 (step 131). If the modification succeeded, step 106 follows.

If the modification succeeded, the copy data is accessed to read or modify the data (step 106). In this case, if the kind of access denotes the output (step 141), the copy data is also supplied to the shared data set 220 in the shared disk 210 (step 143).

After completion of the access, the information which indicates that the data is being accessed and was written in step 103 is reset and the modification number is further counted up (step 107).

The CDSES instruction is again generated (step 108). In step 109, a check is made to see if the execution of the CDSES instruction succeeded or failed. If it failed, the processing routine is returned to step 107 (step 132). If it succeeded, the processing routine is returned (step 120).

On the other hand, if the copy data cannot be accessed in step 102, that is, if the copy data doesn't exist in the CES 200 or the other system is accessing the copy data, the data set 220 in the shared disk 210 is accessed (step 110/144). Even if the copy data can be accessed, the data is actually generated (write-through method) in step 143 so long as the kind of access denotes an output request (step 142), so that the correct value can be supplied from the shared disk 210.

If the staging is necessary, an area to store the copy data is assured (step 140). For the copy data control information 320 which was read in step 101, a message indicating that the relevant data is being accessed is displayed, the modification number is saved into the area of the old modification number 325, and the modification number 321 is counted up (step 111). The CDSES instruction is executed and the modification of the copy data control information 270 in the CES is retried (step 112). If the modification failed (step 113), the processing routine is returned to step 111. If it succeeded, step 114 follows and the copy data for staging is written.

Finally, to reset the information indicating that the data is being accessed, processes in steps 115, 116, and 117 are executed. The contents of the processes in steps 115 to 117 are similar to those in steps 107, 108, and 109.

Figure 4:
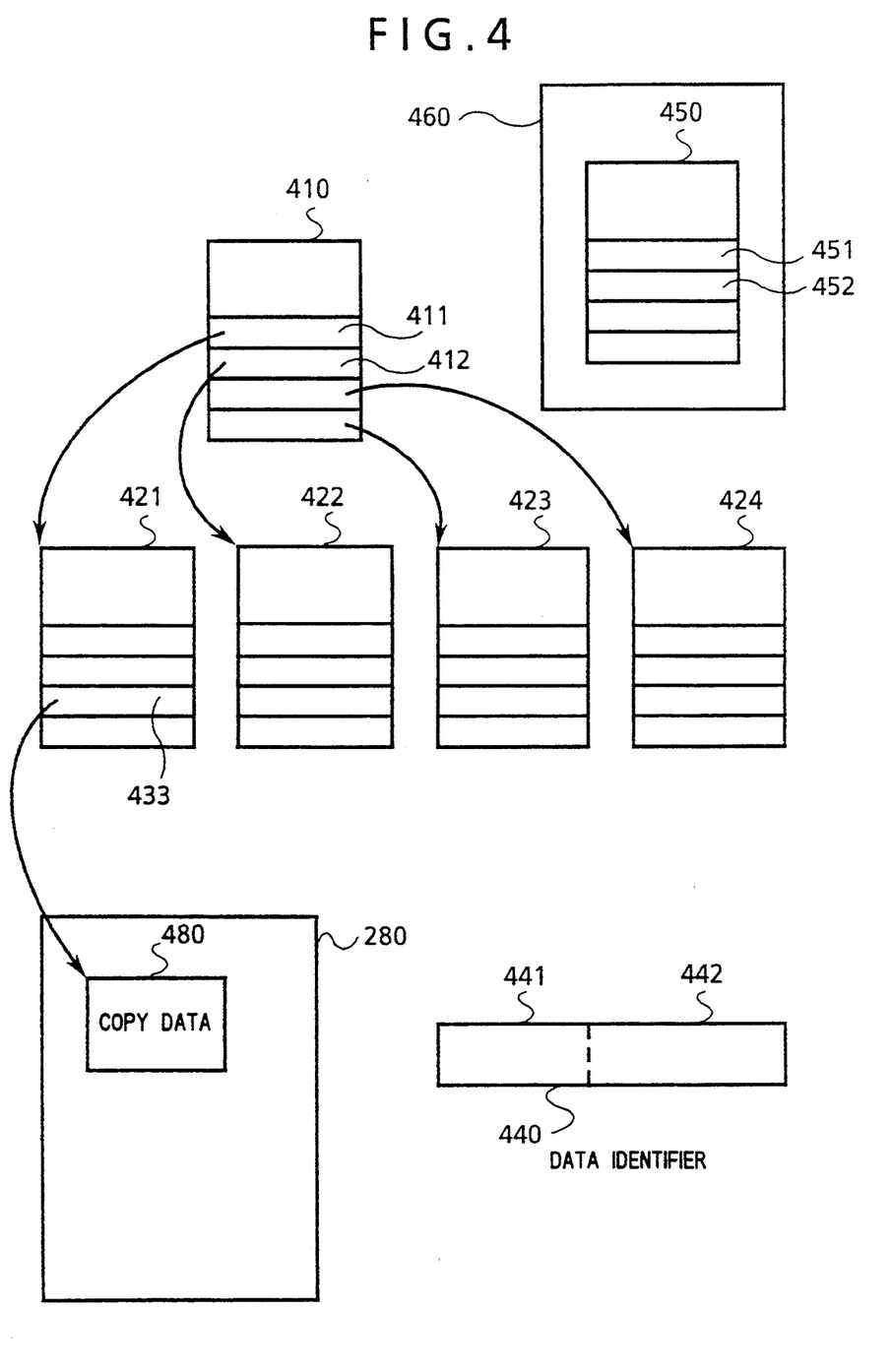
FIG. 4 is a block diagram for explaining an example of a data structure of copy data control information in an embodiment of the invention and its accessing method.

FIG. 4 is a block diagram showing a state in which the copy data control information 270 is divided into a portion 410 whose contents are not modified due to the access and portions 421 to 424 whose contents can be modified. The former portion is referred to as a first kind of control table 410. The latter portions are referred to as second kind of control tables 421 to 424.

Upon initialization of the LCMP system, the area 280 to store the copy data and the area 270 to store the copy data control information are assured in the CES 200 and those areas are initialized. Entries 411 and 412 in the first kind of control table 410 denote the second kind of control tables 421, 422, and the like, respectively. Each entry in the second kind of control tables 421 to 424 can indicate the copy data, for example, 480. In each of the entries in the first kind of control table 410, the second kind of control table is indicated by the initialization and the contents of those entries are not changed through the subsequent access. On the other hand, as for the information which is set by the second kind of control tables 421 to 424, if data is staged by the access, the data identifier of the data, location information of the copy data, and the like are stored or the display indicating that the data is being accessed, the resetting, and the like are modified.

In the data access, if a data identifier 440 is given, the entry such as 411 in the first kind of control table 410 is selected by a first field 441 of the data identifier 440. The entry in the second kind of control table 421 indicated by the relevant entry is selected to, for instance, the entry 433 by using a second field 442 of the data identifier 440. The presence or absence of the copy data can be known from the contents of the above entry and the location and state of the copy data can be also known if such copy data exists.

Figure 5:
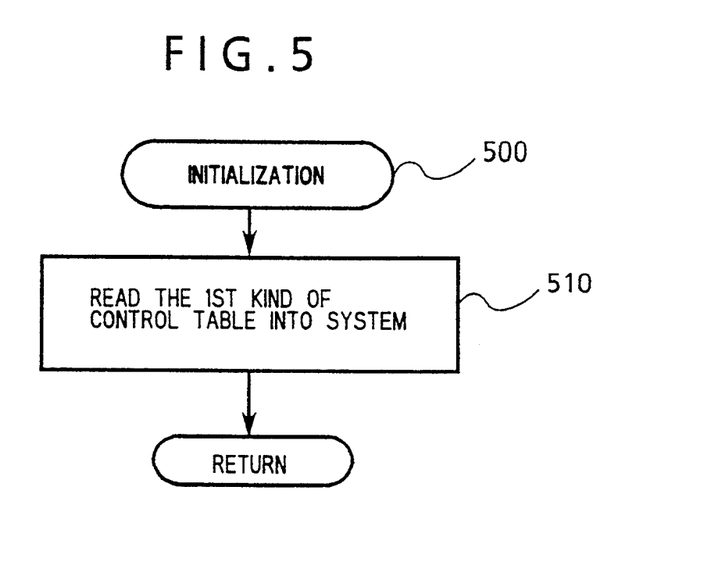
FIGS. 5 and 6 are flowcharts showing initial processes to use the data structure of FIG. 4 and its access processing method.

Each system (control program of each system) previously reads the copy of the first kind of control table 410 into an area 450 in a main storage 460 of the relevant system and holds, for instance, at the time of a request (OPEN) for the start of the data access (step 510 in FIG. 5).

Figure 6:
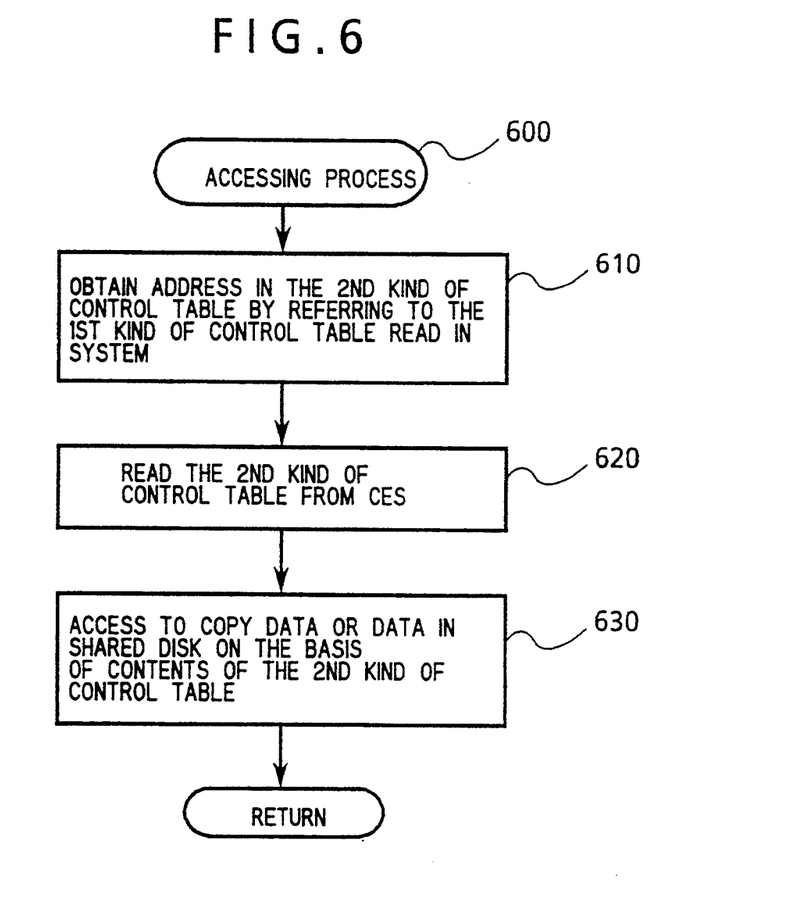

In the access requesting process (600 in FIG. 6) in the system, the reference to the first kind of control table is substituted by the reference to the copy area 450 (step 610). The control table 410 in the CES is not accessed. After that, the second kind of control table is read (step 620). The copy data 480 in the area 470 in the CES can be accessed (step 630).

Figure 7:
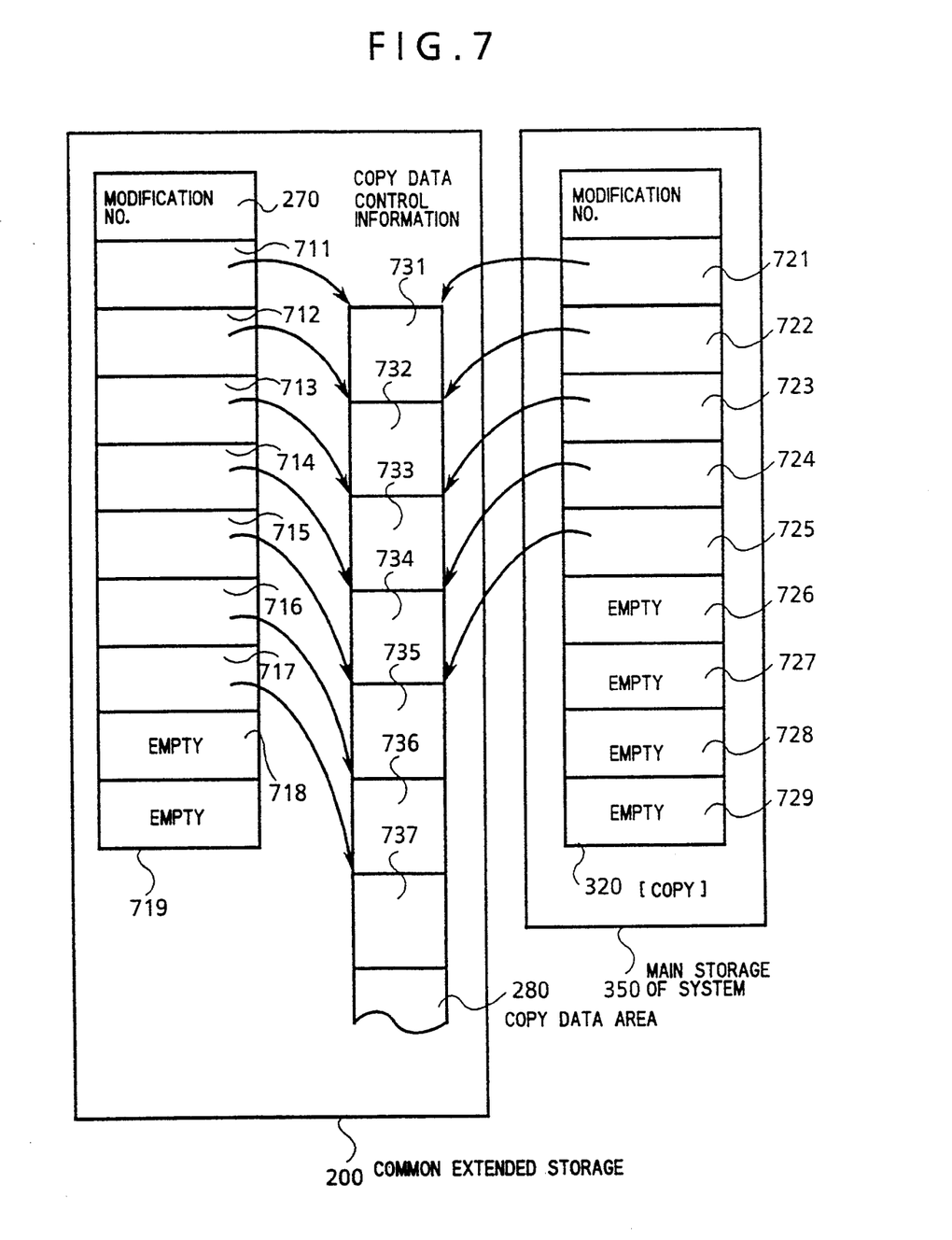
FIG. 7 is a block diagram for explaining a method of reducing the number of accessing times of copy data control information.

FIG. 7 is a block diagram for explaining a method of reducing the copy data control information accessing times in the case of executing a control such that the reference and/or modification are/is executed to the copy data which has already been written into the CES but such a copy data is not deleted and in the case of writing new data, the new data is added into a space area and is not overwritten to the existing copy data. The above add-on control is a condition which can be set in the case where, for instance, an access data amount is predetermined and the area of a capacity more than such a data amount is assured in the CES and the cache control is performed.

In FIG. 7, the copy 320 of the copy data control information 270 exists in the main storage 350 of a certain system. Entries 721 to 725 in the copy 320 already indicate the copy data. However, entries 726 to 729 are in a free status (available status) and indicate no data. On the other hand, in the copy data control information 270 in the CES 200 as original information of the copy 320, entries 711 to 715 indicate the copy data similar to the copy 320. However, entries 716 and 717 corresponding to the entries 726 and 727 in a free status in the copy 320 indicate copy data 736 and 737. Such a difference occurs because after the system had read the copy 320, the other system newly staged the data 736 and 737. On the basis of the above control conditions, the new data 736 and 737 are not overwritten into the existing copy data but are newly added.

Figure 8:
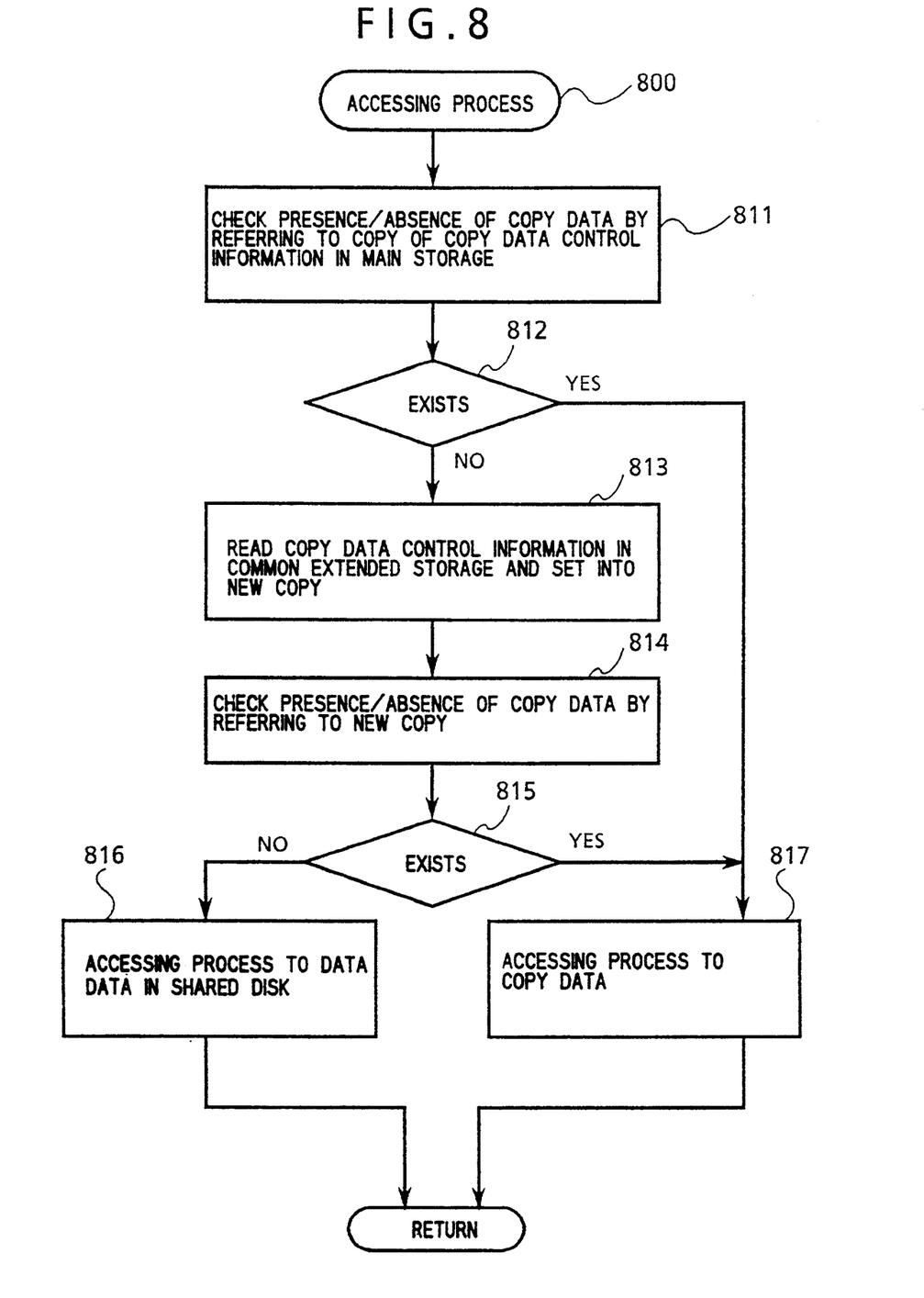
FIG. 8 is a flowchart showing the accessing process in FIG. 7.

FIG. 8 shows a flowchart for the accessing process in such a case. In step 811, a check is first made to see if copy of the data which was access requested exists in the CES or not by using the copy 320 of the copy data control information in the main storage. If the copy data exists as a result of the discrimination, step 817 follows and the copy data is accessed. If the copy data doesn't exist, step 813 follows (step 812).

In step 813, the latest copy data control information 270 is read out of the CES as a new copy 320. In step 814, the presence or absence of the copy data is discriminated by referring to the copy data control information which was newly read. In step 815, if the copy data exists as a result of the discrimination, step 817 follows and the copy data in the CES is accessed. On the contrary, if the copy data doesn't exist, step 816 follows and the data of the shared data set is accessed.

As described in detail above, according to the embodiment, in the LCMP system, the CES is provided and the copy of the shared data set of the shared input-/output device and the copy data control information to control the copied data are stored into the CES. Thus, it is sufficient that the access to the shared data set of the LCMP system is performed to the copy data in the CES. The overhead due to the consistency control of the data between the systems can be reduced.

If the capacity of the CES is increased, a hit ratio is improved and an advantage of increasing of the memory can be directly reflected to the realization of a high shared data set accessing speed.

A serialize instruction (CDSES instruction) is used as an instruction to access to the CES. A consistency control is executed for the data between the memory in each system and the CES. Therefore, the integrity of the control tables of the copy data can be easily realized.

By dividing the copy data control information to the portions whose contents are not changed and the portions whose contents can be changed and by accessing and referring to the main storage or CES, respectively, the number of accessing times to the CES can be reduced.

On the other hand, the staging of the copy is set to only the add-on process. If the presence of the data could be determined by using the copy of the copy data control information which has been read in each system, the number of accessing times to the CES can be reduced and the processing efficiency can be improved.

We claim:

1. A method of controlling shared data among computers in a multiprocessor system in which at least one peripheral unit storing data is shared by a plurality of computers, the method comprising steps of:

providing from a system user an extended storage which is shared and controlled by each of said plurality of computers;

storing a copy of at least a part of the data in said peripheral unit and control information into said extended storage by each of said computers to control the copied data, the control information including information for identifying copied data, information for indicating a location of the copied data in said extended storage and version information indicating a state of modification of the copied data;

copying the control information in the common extended storage into a main storage of a computer;

saving the version information of the control information in the main storage as old version information;

obtaining control information whose version-up was executed by performing a desired modification to the control information in the main storage;

comparing the version information in the common extended storage with the old version information in the main storage;

rewriting the control information in the common extended storage in accordance with the control information of the version-up contents in the main storage if both the version information and the old version information are equal as a result of the comparison; and copying the control information in the common extended storage into the main storage if both the version information arid the old version information are not equal as a result of the comparison.

2. A method of controlling shared data among computers in a multiprocessor system in which at least one peripheral unit storing data is shared by a plurality of computers, the method comprising steps of:

providing by a system user an extended storage which is shared and controlled by each of said plurality of computers;

storing a copy of at least a part of the data in said peripheral unit and control information into said extended storage by each of said computers, the control information including information for corresponding the data in said peripheral unit with copied data; and controlling access to the copied data by using said control information.

3. The method according to claim 2, wherein when an access request which is generated in one of the plurality of computers is an input request of the data which the peripheral unit has, the method further comprises discriminating by the one computer whether data corresponding to said access request has been stored in the extended storage or not by referring to the control information, if the data has been stored in the extended storage, supplying the data corresponding to said request from the extended storage, and if the data is not stored in the extended storage, supplying the data corresponding to said request from the peripheral equipment, copying said input data into the extended storage, and storing the control information regarding the copied data into the extended storage.

4. The method according to claim 2, wherein when an access request which is generated in said computer is an output request of data to the peripheral equipment, the method further comprises generating and transmitting by said computer the data to the peripheral equipment, discriminating by the computer whether the copy of the data in a state before said data is changed exists in a common extended storage or not by referring to the control information, if the copy of the data before said data is changed exists in the common extended storage, rewriting said copy by said output data, if the copy of the data in a state before the data is changed does not exist in the common extended storage, preparing a new area in the common extended storage, writing said output data into said new area, forming control information to control the copy written in said new area, and storing the control information formed into the common extended storage.

5. The method according to claim 2, wherein the control information includes version information which is copied and stored into the common extended storage, the version information indicating a state of modification of the copied data in said extended storage, a serialize instruction for executing a series of stems by one instruction by inhibiting an access to a predetermined area in the common extended storage from the other computers is provided as an access instruction to the common extended storage from said computer, and said series of steps include the steps of:

copying the control information in the common extended storage into a main storage;

saving the version information of the control information in the main storage which was copied as old version information;

obtaining control information whose version-up was executed by performing a desired modification to the control information in the main storage which was copied;

comparing the version information in the common extended storage with the old version information in the main storage;

rewriting the control information in the common extended storage into the control information of the version-up contents in the main storage if both of the version information are equal as a result of the comparison; and again copying the control information in the common extended storage into the main storage and retrying said serialize instruction if both of the version information are not equal as a result of the comparison.

6. The method according to claim 2, further comprising steps of:

dividing and constructing a control table to store the control information, the control information including portions whose contents are not changed during the access to the data and portions whose contents can be changed during the access to the data, previously reading unchanged portions of the control information into each of the computers from the common extended storage, and when accessing the copied data, referring to the unchanged portions of the control information which have previously been read.

7. The method according to claim 6, further comprising steps of:

if an access request is generated to a computer, checking to determine if the copied data exists in the common extended storage or not by referring to the unchanged portions of the control information which has previously been read, if the copied data exists as a result of the discrimination, accessing the copied data in the common extended storage, if the copied data does not exist as a result of the discrimination, reading additional control information in the common extended storage into the computer, and checking to determine if the copied data exists in the common extended storage or not by referring to the additional control information which has newly been read, if the copied data exists as a result of said rediscrimination, accessing the copied data in the common extended storage, and if the copied data does not exist as a result of the rediscrimination, accessing the data corresponding to the access request stored in the peripheral equipment.

8. The method according to claim 2, further comprising providing the data which is shared by the computers as data of a catalog data set.

9. The method according to claim 2, further comprising providing the data which is shared by the computers as data of a data base.

* * * * *

UNITED STATES PATENT AND TRADEMARK OFFICE
CERTIFICATE OF CORRECTION

PATENT NO. : 5,363,498
DATED : November 8, 1994
INVENTOR(S) : Taketoshi Sakuraba, et al.

It is certified that error appears in the above-indentified patent and that said Letters Patent is hereby corrected as shown below:

Claim 5, column 17, line 62, delete "stems" and substitute therefor --steps--.

Signed and Sealed this

Third Day of January, 1995

BRUCE LEHMAN

*Attest:*

*Attesting Officer*        *Commissioner of Patents and Trademarks*